(12) United States Patent
Balzan et al.

(10) Patent No.: US 11,106,055 B2
(45) Date of Patent: Aug. 31, 2021

(54) METHOD FOR PRODUCING AN OBJECT COMPRISING A RIGID METAL CORE AND A POLYMER-MATERIAL EXTERNAL COATING, AND OBJECT OBTAINED THEREWITH

(71) Applicant: HAPTER S.R.L., Belluno (IT)

(72) Inventors: Eric Balzan, Belluno (IT); Mirko Forti, Belluno (IT)

(73) Assignee: HARTER S.R.L., Belluno (IT)

( * ) Notice: Subject to any disclaimer, the term of this patent is extended or adjusted under 35 U.S.C. 154(b) by 349 days.

(21) Appl. No.: 16/077,745

(22) PCT Filed: Feb. 21, 2017

(86) PCT No.: PCT/IB2017/050970
§ 371 (c)(1),
(2) Date: Aug. 14, 2018

(87) PCT Pub. No.: WO2017/145043
PCT Pub. Date: Aug. 31, 2017

(65) Prior Publication Data
US 2019/0072780 A1  Mar. 7, 2019

(30) Foreign Application Priority Data
Feb. 26, 2016 (IT) .................. 102016000020271

(51) Int. Cl.
*G02C 5/00* (2006.01)
*B29D 12/02* (2006.01)
(Continued)

(52) U.S. Cl.
CPC ............... *G02C 5/008* (2013.01); *B32B 3/00* (2013.01); *B32B 3/26* (2013.01); *B32B 7/04* (2013.01);
(Continued)

(58) Field of Classification Search
CPC ........ G02C 2200/02; G02C 9/00; G02C 5/00; G02C 11/10; G02C 1/02; G02C 11/02; G02C 2200/08; G02C 1/06; G02C 11/00; G02C 5/001; G02C 11/06; G02C 11/08; G02C 1/04; G02C 3/003; G02C 1/08; G02C 5/006; G02C 3/04; G02C 5/008;
(Continued)

(56) References Cited

U.S. PATENT DOCUMENTS

2002/0034912 A1   3/2002   Curro

FOREIGN PATENT DOCUMENTS

| WO | 00/46628 A1 | 8/2000 |
|---|---|---|
| WO | 2008/136036 A1 | 11/2008 |
| WO | 2010/049743 A1 | 5/2010 |

*Primary Examiner* — Collin X Beatty
*Assistant Examiner* — Grant A Gagnon
(74) *Attorney, Agent, or Firm* — Mark M. Friedman

(57) ABSTRACT

To ease and improve the production of objects, a method is described for producing an object (60) comprising a structural core (10) and an outer coating of polymeric material (52), comprising the steps of
(i) coating with polymeric material (50) a lamina (10), wherein the lamina comprises a surface exhibiting macroscopic discontinuities (32) configured so that the polymeric material grips to them in order to form a multilayered piece;
(ii) removing parts from the multilayer piece to obtain a contour corresponding to the object, the contour comprising an edge (B) along which a margin of the lamina remains uncovered by the polymeric material.

20 Claims, 5 Drawing Sheets

(51) Int. Cl.

| | | |
|---|---|---|
| B32B 3/00 | (2006.01) | |
| B32B 21/04 | (2006.01) | |
| B32B 27/32 | (2006.01) | |
| B32B 9/04 | (2006.01) | |
| B32B 23/04 | (2006.01) | |
| B32B 15/06 | (2006.01) | |
| B32B 15/18 | (2006.01) | |
| B32B 27/36 | (2006.01) | |
| B32B 21/08 | (2006.01) | |
| B32B 27/34 | (2006.01) | |
| B32B 15/095 | (2006.01) | |
| B32B 27/38 | (2006.01) | |
| B32B 25/04 | (2006.01) | |
| B32B 27/12 | (2006.01) | |
| B32B 27/40 | (2006.01) | |
| B32B 7/12 | (2006.01) | |
| B32B 25/20 | (2006.01) | |
| B32B 15/088 | (2006.01) | |
| B32B 15/04 | (2006.01) | |
| B32B 15/10 | (2006.01) | |
| B32B 15/085 | (2006.01) | |
| B32B 23/10 | (2006.01) | |
| B32B 15/092 | (2006.01) | |
| B32B 25/10 | (2006.01) | |
| B32B 21/10 | (2006.01) | |
| B32B 15/09 | (2006.01) | |
| B32B 7/04 | (2019.01) | |
| B32B 3/26 | (2006.01) | |

(52) U.S. Cl.
CPC ............... *B32B 7/12* (2013.01); *B32B 9/04* (2013.01); *B32B 9/041* (2013.01); *B32B 9/042* (2013.01); *B32B 9/045* (2013.01); *B32B 9/047* (2013.01); *B32B 15/04* (2013.01); *B32B 15/06* (2013.01); *B32B 15/085* (2013.01); *B32B 15/088* (2013.01); *B32B 15/09* (2013.01); *B32B 15/092* (2013.01); *B32B 15/095* (2013.01); *B32B 15/10* (2013.01); *B32B 15/18* (2013.01); *B32B 21/04* (2013.01); *B32B 21/042* (2013.01); *B32B 21/045* (2013.01); *B32B 21/08* (2013.01); *B32B 21/10* (2013.01); *B32B 23/042* (2013.01); *B32B 23/044* (2013.01); *B32B 23/10* (2013.01); *B32B 25/04* (2013.01); *B32B 25/10* (2013.01); *B32B 25/20* (2013.01); *B32B 27/12* (2013.01); *B32B 27/32* (2013.01); *B32B 27/34* (2013.01); *B32B 27/36* (2013.01); *B32B 27/38* (2013.01); *B32B 27/40* (2013.01); *B32B 2250/40* (2013.01); *B32B 2262/08* (2013.01); *B32B 2262/106* (2013.01); *B32B 2307/402* (2013.01); *B32B 2307/546* (2013.01); *B32B 2437/00* (2013.01); *B32B 2551/00* (2013.01); *G02C 2200/12* (2013.01); *G02C 2200/14* (2013.01)

(58) Field of Classification Search
CPC ........ G02C 5/10; G02C 5/122; G02C 5/2209; G02C 9/02; G02C 1/00; G02C 2200/10; G02C 2200/22; G02C 5/02; G02C 5/08; G02C 5/143; G02C 5/20; G02C 5/2263; G02C 7/02; G02C 9/04; G02C 2200/16; G02C 3/02; G02C 5/12; G02C 5/126; G02C 5/146; G02C 5/16; G02C 5/2254; G02C 5/2272; G02C 7/083; G02C 7/085; G02C 7/16; G02C 11/12; G02C 13/00; G02C 13/001; G02C 13/003; G02C 13/005; G02C 1/10; G02C 2200/12; G02C 2200/18; G02C 2200/24; G02C 2202/20; G02C 5/04; G02C 5/06; G02C 5/124; G02C 5/14; G02C 5/18; G02C 5/22; G02C 7/021; G02C 7/046; G02C 7/08; G02C 7/10; G02C 7/101; G02C 7/104
USPC .......................................................... 351/41
See application file for complete search history.

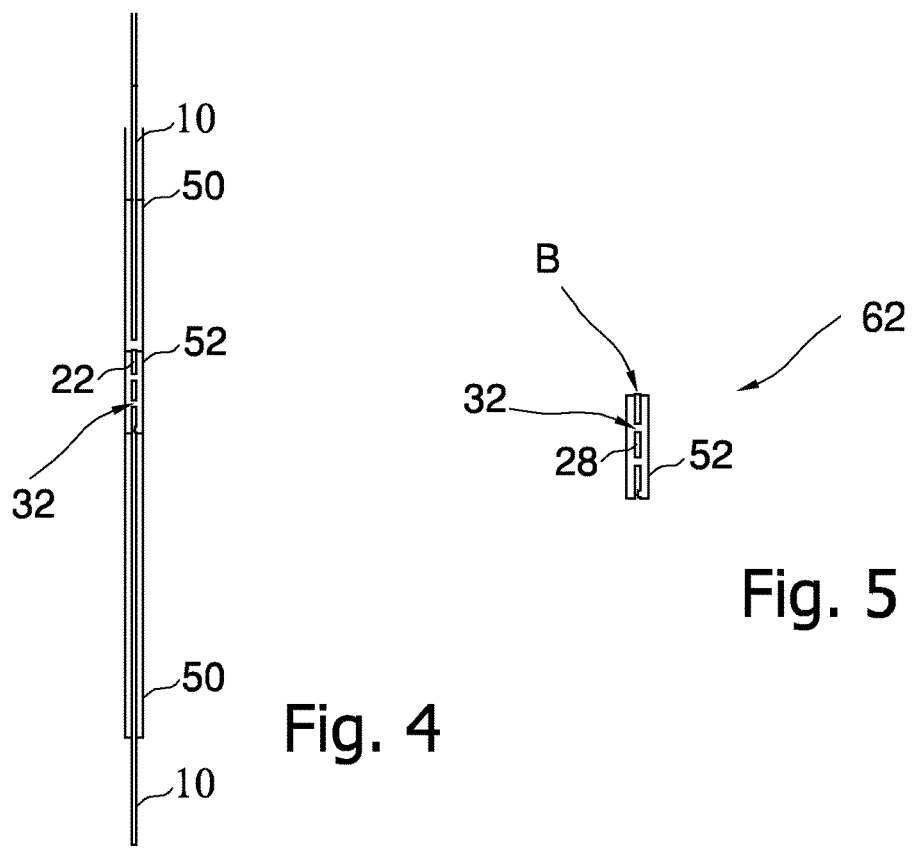
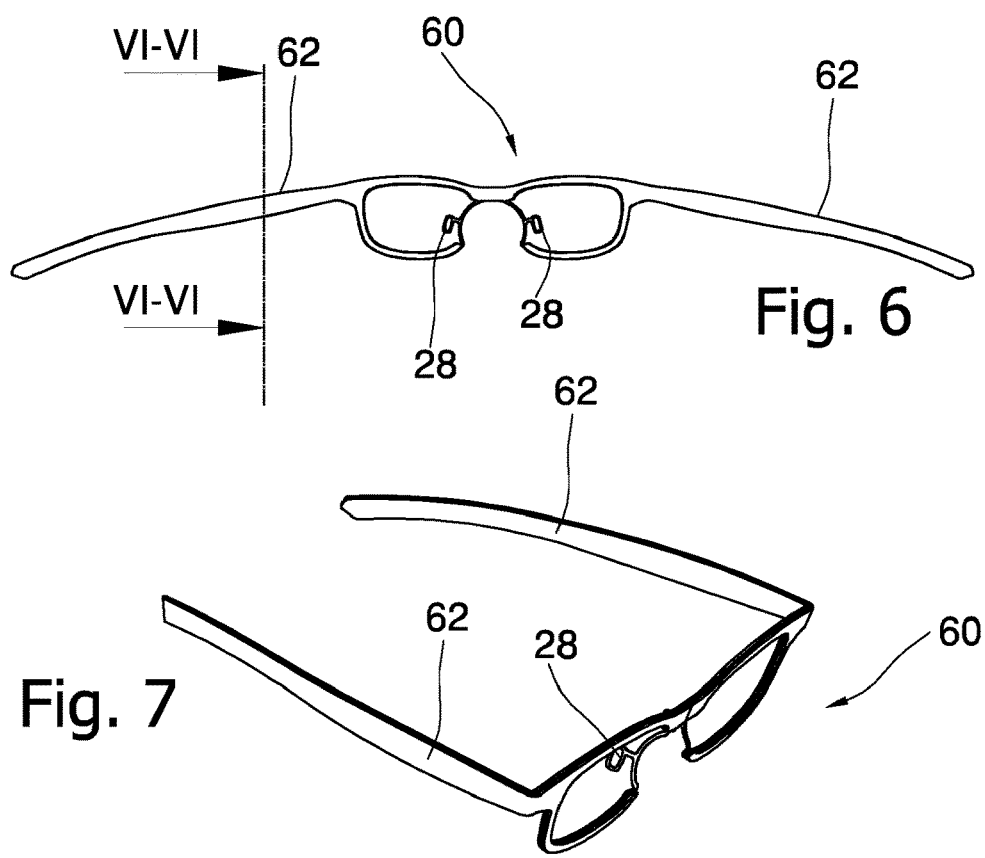

METHOD FOR PRODUCING AN OBJECT COMPRISING A RIGID METAL CORE AND A POLYMER-MATERIAL EXTERNAL COATING, AND OBJECT OBTAINED THEREWITH

The invention relates to a method for producing an object comprising a rigid, e.g. metallic and e.g. flat, core and an external coating made of polymeric material. The object is preferably a frame front of eyeglasses, or part of it like a temple, a terminal or a front mask of eyeglasses. The invention is however usable to produce a jewel, an article of jewelry, a casing for cellular phone or electronic device, a watch or part of it, a handle, e.g. for knife, a metallic label, garment accessories such as buttons or labels, accessories or parts of footwear, such as soles, or a household article. The invention is also directed to the object as produced by the method.

If we refer as an example to the field of eyewear, we note that most of the models made of polymeric material is made of cellulose acetate or other polymeric material, for example plastic or rubber. The acetate sheet is extruded and sometimes a pre-cut metallic core is inserted into it. Alternatively, the plastic material is joint-fitted on the metallic core, which is always pre-cut. Unfortunately, these techniques are costly and unsophisticated, and require several processing steps to combine elements prepared separately. For the models made out of polymeric material, instead, injection or compression molding is used mostly. Rubber is a material that with its softness has aesthetic and tactile merits, ensures lightness, comfort of fit and allows obtaining even rather complex geometries with high aesthetic impact. Being too weak to produce structurally solid eyeglasses, rubber is over-injected on a support structure, which can be made of metal or a harder and more resistant plastic, that lends strength to the glasses, or a component thereof, and above all allows to adjust the eyeglasses, e.g. the head-support zone. FR 81 00578 and PD2011A000202 use this technique to produce a temple for eyeglasses having a metallic reinforcement core completely covered by thermoplastic and/or polymeric material.

Injection molding generally has the disadvantage of requiring costly molds, which reduces the possibility of producing limited series. In a very variegated field such as that of eyeglasses, the cost of the mold is an even more important factor since you need one mold for each model, size and style.

Recently multilayered-material eyeglasses gained popularity in which you can see on their edge the stratification, as described, for example, in WO2013182894A1. The ability to see the layers has both an aesthetic appeal, and the technical effect that the structural-material core gives support to the entire structure of the eyeglasses, also along the contour, where otherwise the coating would be without structure and therefore potentially more subject to wear. The layers are glued together and then cut to form a pair of eyeglasses. The process is still improvable, because time and expertise are necessary to match precisely and solidly the layers. In particular, it is not easy to ensure the adhesion between a plastic material and the internal reinforcement metal given that the corrosion of sweat often affects the chemical bond thereof, negating its grip. And there is also the fact that the adhesive layer, remaining visible on the edge, is less esthetic and generates burrs, especially when it has a thickness comparable with the layers of the eyeglasses.

The invention aims to improve this state of the art, and proposes a method for producing an object comprising a rigid structural core and an outer polymeric-material coating. The method comprises the steps of (i) coating with polymeric material a lamina, wherein the lamina comprises a surface which exhibits macroscopic discontinuities configured so that the polymeric material grips to them in order to form a multilayered piece;

(ii) removing parts from the multilayered piece to obtain a contour corresponding to the object, the contour comprising an edge along which a margin of the lamina remains uncovered by the polymeric material.

The polymeric material may be for example polyurethanic or siliconic rubber, acetate of cellulose, methacrylate, polyethylene, grilamid, nylon or polypropylene, but also an epoxy resin; and/or a natural polymeric material, such as e.g. rubber, natural rubber, wood, leather, horn. These materials soften and then can go through the macroscopic discontinuities.

By rigid here it is meant a material capable of maintaining its shape, being inflexible or elastically flexible, in any case not foldable like a fabric.

By macroscopic discontinuities it is here meant structural or morphological deviations from a mere smooth surface, not attributable to the inherent roughness of the metal but obtained specifically for—and functional to—the adhesion of the polymeric material. E.g. they may be constituted by: openings or slots or pass-through holes that pass through the thickness of the lamina from side to side; and/or cavities and/or inlets and/or undercuts and/or notches and/or protruding reliefs as serrations, teeth, combs. The macroscopic discontinuities may be present on the entire lamina or confined to only one or more portions of the lamina isolated from each other.

The method allows that in the object the core and the outer coating resulting from the polymeric material are tenaciously united by a strong mechanical bond. The macroscopic discontinuities have a retention effect on the polymeric material, especially in the case of pass-through openings.

According to a first aspect of the method, the lamina in step (i) may have already the shape or the final profile of the object to be produced (the shape of the lamina substantially coincides with that of said contour). Said parts removed in step (ii) refer e.g. to burrs or centering points or peduncles present around the lamina and intended for the centering or stabilization inside a mold cavity. Step (ii) may also comprise an operation of subsequent rectification of the contour or of the lamina.

According to a second aspect of the method, the lamina in step (i) may be derived by separating it from a larger lamina. Said removal of parts in step (ii) is characterized in particular with the additional step of separating from the multilayered piece a contour corresponding to the object, so that the contour comprises an edge along which a margin of the lamina remains uncovered by the polymeric material. Note that in this step of separation from the larger lamina the effect of retention on the polymeric material given by the macroscopic discontinuities is even more advantageous, since the polymeric material is stressed and could move and/or be damaged and/or deformed.

Preferably the method provides the step of processing the surface of the lamina for deriving therein macroscopic discontinuities constituted by pass-through openings or concavities, and the lamina so processed is used to perform the step (i).

It is advantageous to equip the lamina with pass-through holes through which the molten polymeric material can pass through. For the molten material this solves the problem both of the gripping and of the difficulties of sliding through the core's perimeter, e.g. in the case in which the mold cavity has the same perimeter of the lamina. The method however also envisages an option of using as a lamina a plate already equipped with the macroscopic discontinuities, e.g. a net.

Note that the method allows obtaining a single mold functional for producing by successive passages different eyeglasses, or parts of them, thereby further reducing the construction costs of the molds and their tooling for the production of different models.

In step (i) one may apply the polymeric material on the lamina with various technologies, such e.g. by plastification, electrophoresis, compression molding, optionally also by vulcanization of the rubber in the case of thermosetting material; or by rolling, or by means of ultrasounds or high frequency, or by gluing, for example of two sheets of plastic material around the lamina, or by resin or plastic material casting into an open mold.

Step (i) may also involve mixed molding techniques. E.g. one may mold by injection a layer of polymeric material in a separate mold, and then use such layer as a base layer on which to lay the lamina for the subsequent coating according to step (i). Or one can apply on a side of the lamina a layer of rubber obtained by extrusion, that will be later incorporated by the rubber injected or compressed during step (i).

Phase (i) may also occur through plastification or adhesive coating (in this case the epoxy resin would drip and then solidifies through the discontinuities, acting as a link between two layers of fabric, for example). Phase (i) may also occur by sintering.

Preferably, step (i) takes place by melting the polymeric material after depositing the lamina into a mold cavity, and between step (i) and step (ii) the polymeric material is waited for gripping to—and solidify on—the discontinuities. In particular, said melting may occur during a phase of injection molding; thus one is able to take advantage of this proven technology thereby making it possible to mold by injection on the lamina all of the injectable thermoplastic materials. The polymeric material is then molten material and step (i) envisages the over-injection of molten material on the lamina inside a closed mold cavity, having laid previously the lamina inside the cavity. In this case it is preferable to perform the step of waiting for the polymeric material to solidify and grip to the discontinuities.

By carrying out step (i) through over-injection of molten material, the invention gives additional advantages. It is a known problem, in fact, that the more reduced the cavity which the molten material must travel before solidification, the higher the temperature/pressure/speed required to the injection, and therefore the greater the problems of sealing the structural core to be over-injected, and of precision and sealing of the mold during the injection phase. Also, a(n) (expensive) mold is needed for each model or for each different shape of product to be over-molded, as it is shown by the technique outlined by PD2011A000202 for the production of a temple, in which a core of structural material is molded with polymeric material to embed also some composite material.

An advantage of the invention derives from the simple placement of the lamina in a mold, from which there results a simplification of the structure of the mold itself, e.g. complex locking means for the lamina are not necessary, because the two half-parts of the mold may close over the lamina and lock it. Another advantage is the relative size between the lamina and the mold, so that the lamina may be placed into a mold cavity which has dimensions substantially complementary to the lamina (geometric centering and locking) or smaller size (to clamp it between said half-parts). When the molten material covers the plate inside the mold, it has in fact only a single, relatively large volume in which to move, without twisted ducts or minute cavities to fill.

In any variant of the method, preferably the lamina is
- a rigid lamina, e.g. made of metal or other composite material; and/or
- flat-shaped or
- previously folded to achieve a three-dimensional shape. In case in step (i) a mold is used, it will be designed to accommodate the three-dimensional lamina.

In any variant of the method said surface that has macroscopic discontinuities may involve (a) the whole lamina or (b) only one or more portions of it.

For case (a) and if the lamina of step (i) is obtained from a larger lamina, in step (ii) preferably said contour is separated only by cutting the multilayered piece in correspondence of superimposed layers of polymeric material and lamina. Namely, the thickness of the multilayer piece is cut along a profile which determines that of said contour, that is by cutting one at a time and sequentially the superimposed layers of the multilayered piece. This cutting step of the multilayered piece occurs preferably by following a desired profile for the contour, to get a separate contour or product that at the edges has the layers of the multilayered piece visible and overlapping. That is to say, the object's final shape is determined in/by step (ii) when it will be the separation step to establish the final outline of the object and the contour.

For case (b) preferably a lamina is produced comprising a surface which has macroscopic discontinuities in two or more (isolated) areas matching distinct objects to be produced. If the lamina is obtained from a larger lamina, in step (ii) contours restricted to such areas can be disconnected from the multilayered piece to isolate the relative objects. An advantageous aspect therefore envisages that the lamina comprises at least two areas to be processed with phase (i) and from which to obtain, through removal according to step (ii), separate and mutually isolated objects. This phase allows both producing many pieces at the same time, and minimizing the waste resulting from opening the mold during injection or from an incomplete and little filling of the mold by the fluid polymeric material, before its solidification.

For case (a) and/or for case (b), and if the lamina of phase (i) is obtained from a larger lamina, the method envisages a further advantageous variant: to obtain said contour in the lamina, a passing-through groove is produced to derive a perimetral profile detached from the rest of the lamina except for some local connection or attack points, and in step (ii) the portion relating to such profile is separated by removing polymeric material deposited in the groove during step (i). The use of a lamina with a pre-cut profile for the contour allows a faster and smoother phase (ii), whether only one object is separated from the lamina (case (a)) or a plurality of objects (case (b)) are. Preferably inlets are realized in the perimetral profile and, in correspondence of the inlets, local connection or attack or break points are arranged, to be broken when the contour is separated from the rest of the lamina. The advantage is to relegate any burr or defects caused by the separation in step (ii) within the inlets, away from sight and/or from contact with the end user.

From the foregoing, it is understood that the method can allow having a single mold with a single cavity to produce various eyeglasses, or different parts of it, avoiding the multiplication of molds and greatly reducing tooling costs. The mold cavity can have abundant or sufficient size to receive a lamina comprising shapes of different objects to over-inject with the polymeric material (step (i)) and then to be separated from one another (step (ii)). In other words, a lamina is inserted in a larger mold cavity, and the whole mold cavity is filled with polymeric material; or the lamina can be obtained from a metal plate by piercing on the plate almost the entire profile of the core, so as to leave it attached to the plate only at a few connection or attachment points. Then with step (ii) the excess of material will be removed, optionally by cutting or by shaping the lamina too.

As another advantage, the method envisages that, to produce many pieces of a single model or shape of the product, one can build a mold dedicated exclusively to the particular model, thereby compensating the cost of the mold with the improvements obtained by speeding and improving productivity; and/or one can realize a mold which perfectly reproduces the perimeter of the lamina (the mold cavity has dimensions substantially complementary to the perimetral dimensions of the lamina profile, to produce an object at a time), and during step (i) the lamina is embedded in the polymeric material; and/or one can create a mold that reproduces a perimeter different from the lamina, for example smaller, in order to leave uncovered the edge of the structural core in the finished product.

According to another variant of the method, one can remove polymeric material deposited over a zone of the contour or of the lamina which is devoid of macroscopic discontinuities. The effect is e.g. to derive on the object an area with the lamina in sight and/or to remove a strip of polymeric material along the perimeter of the contour, so as to highlight an underlying edge of the lamina. One may remove polymeric material from all or some parts of the lamina that lie on areas devoid of macroscopic discontinuities, such as in points that require a subsequent welding of small metal parts (hinges, etc.). The aforesaid removal is not burdensome to do because the polymeric material is easily removed from the lamina in the smooth part where there are no macroscopic discontinuities. In general, the lamina or the core underlying the polymeric material may be made more or less visible. In particular, the removal can involve only polymeric material or polymeric material and the core. In particular, to cut or remove only polymeric material from the multilayered piece without removing part of the lamina, allows obtaining a particular configuration of the frame front, that is, a peripheral edge projecting from the lamina with respect to the layers of polymeric material. If this projecting edge is realized on the frame front, where a lens is attached, the method allows snap-in mounting on the projecting edge a lens that has a peripheral groove.

Before step (i) the lamina can be advantageously processed to produce particular effects, e.g. it can be colored, or finished with special effects (e.g. brushed) or a layer of composite material, of fabric, leather or other material, e.g. polymer, may be applied thereto, and the layer will be then incorporated by the polymeric material.

If in step (i) a technique is used involving a mold, according to another variant of the method prior to the step (i) a second material is disposed on a bottom of the mold to make it couple with the polymeric material. In particular, as the second material it is possible to insert in the mold, or to couple to the coated lamina, a material e.g. chosen among fabric, wool, leather, wood, horn, carbon fiber, gold or silver leaf, perforated steel, or any other material that can be incorporated by the polymeric material. Thus, one will be able to couple, in a single step, several layers of material, obtaining that said multilayered piece exhibits already a coating material coupled externally to the polymeric material. In this way the method allows a saving of time compared to a subsequent application of the second material on the separate contour. If the material has particular or three-dimensional shape, e.g. diamond-shaped or conical-shaped, a widest part thereof can remain trapped in—and retained by—the polymeric material and there stay welded, without any need e.g. to glue it. The second material may be applied before step (i) also with techniques that do not use a mold, or anyway different techniques, e.g. by lamination.

Preferably, in step (ii) there is performed the separation step by means of cutting or shearing, although other techniques are possible as e-g. milling or die-cutting or abrasion adjustment, or laser cutting, water-jet cutting, direct abrasion, or any other technique of correction.

The method envisages variants to give the object a particular aspect and thus save costs and processing time for subsequent steps, avoiding e.g. having to lengthen the process with subsequent surface treatments. E.g. on the cavity or on a bottom of the mold, one can:

realize a negative- or positive-relieved design (relief) to be transferred onto the surface of the polymeric material or of the said second material; and/or deposit color powders or metal powders, which will be embedded by the polymeric material during step (i); and/or place an element, made of one among stone, horn, precious materials, wood or any other material, so that it is incorporated by the polymeric material; and/or insert a sheet of metal or other material having a particular surface effect.

Or before or after step (ii) on the surface layer of polymeric material of the contour another material (called here: third material) is applied, such as e.g. fabric, wool, leather, wood, horn, carbon fiber, gold or silver leaf, perforated steel, or stones, precious stones, studs, or any other material that can be coupled to the polymeric material according different processes, such as coupling by hot compression, gluing, lamination, ultrasonic or high frequency welding. Such subsequent coupling to step (i) may be made on the whole surface or a partial surface of the contour.

Before or after step (ii) the contour may receive other advantageous processing. E.g.:

a flat contour can be bent and/or kneed to give it a three-dimensional shape; and/or the contour can be varnished, increasing the aesthetic effect and resistance; and/or the third material can be applied on the contour, such as e.g. fabric or other material in sight, with the preferable subsequent step of applying a surface resin to protect the fabric or color;

by mechanical treatment, e.g. abrasion.

Subsequently to step (ii) there is preferably a step of finishing the contour, separated or not from a larger lamina, relatively to the exposed edge of the lamina and/or the object resulting from step (ii), to clean it from possible burrs or material residues, which e.g. would prevent to see the lamina along the edge of the product. Such cleaning and finishing stages can be made by various methods such as milling, sanding or sandblasting.

The invention is also directed to an object produced by the method. The object comprises a multilayered structure composed of a inner structural core and an ecternal coating made of polymeric material, wherein the core comprises a surface that exhibits macroscopic discontinuities (such as defined for the method) to which the polymeric material is gripped, and the object comprises a surface in which an edge of the core remains uncovered.

The uncovered edge of the core may have any length, from a few centimeters up to involving the entire perimeter of the object; and/or comprises the visible overlapping of the core and at least one layer of polymeric material. Preferably the core is sandwiched between two layers of polymeric material.

In particular, said structure comprises a portion clear from polymeric material, in said clear portion the core having a surface devoid of macroscopic discontinuities, which can be e.g. a peripheral edge of the lamina protruding from a layer of polymeric material or an area of the core free from polymeric material (e.g. of/on the nose pads).

Preferably the said edge of the object comprises local inlets, where attachment points to the lamina were located.

A preferred embodiment of the method for producing a pair of eyeglasses will now be described in detail with the aid of the accompanying drawings, wherein FIG. 1 shows a plan view of a metallic lamina;

FIGS. 4 and 5 show a cross-sectional view according to planes IV-IV and VI-VI;

FIG. 6 shows a plan view of eyeglasses obtained at a later step of the method;

FIG. 7 shows a three dimensional view of the eyeglasses of FIG. 6;

In order not to crowd too much the drawings, some references are omitted. Identical numbers indicate equal parts.

Figure 1:
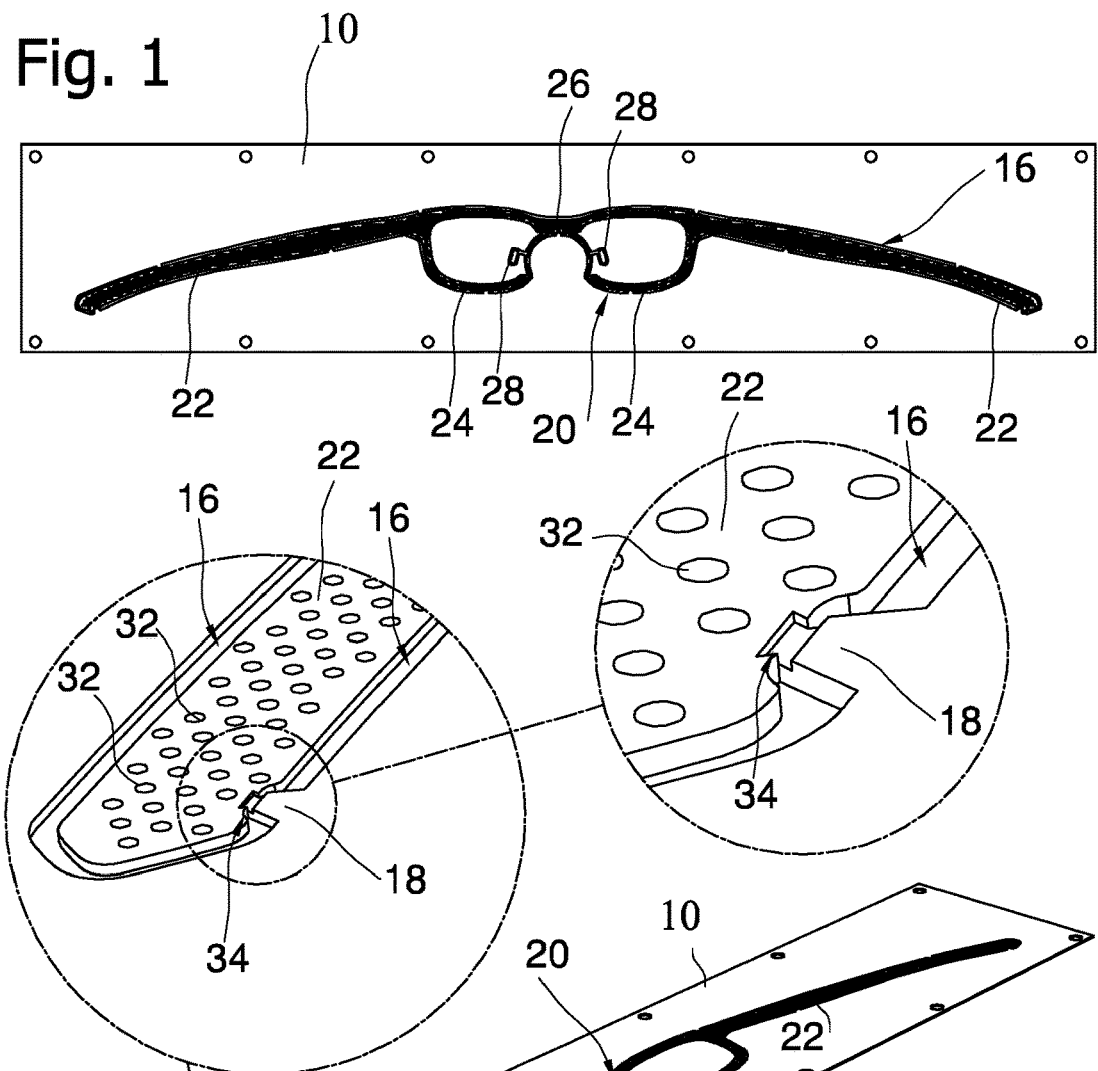

To produce an entire pair of eyeglasses, FIG. 1, a mask or flat metallic lamina 10 with structural function is prepared within which there is formed the contour of a core 20 along a cutting line 16.

The core 20 is a single flat piece formed by a central frame front and two temples 22. The frame front 24 comprises two slots 24 for lenses, a central bridge 26 and two nose pads 28.

Figure 2:
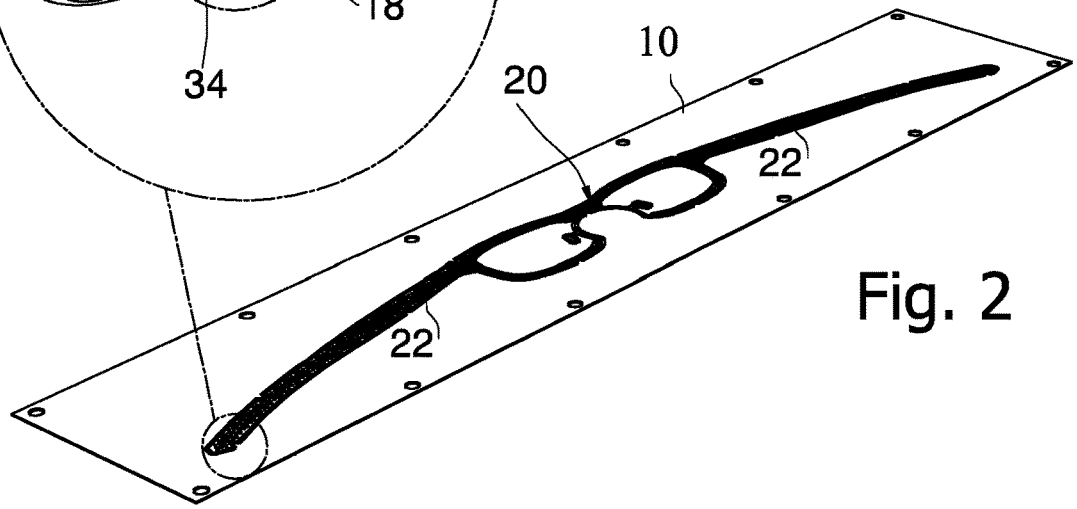
FIG. 2 shows a perspective view of the lamina in FIG. 1.

As can be seen from the details in FIG. 2, the core 20 has a plurality of through-holes 32 distributed uniformly over its entire surface (except on the pads 28). Therefore the core 20 is separated from—and suspended to—the rest of the lamina 10 along a perimeter or through-slot (indicated with 16) except in localized attack points (FIG. 2). These points comprise a tab 18 which extends from the edge of the slot 16 towards the core 20 to join thereto through a portion of reduced thickness at an inlet or concavity 34 of the profile of the core 20.

Figure 3:
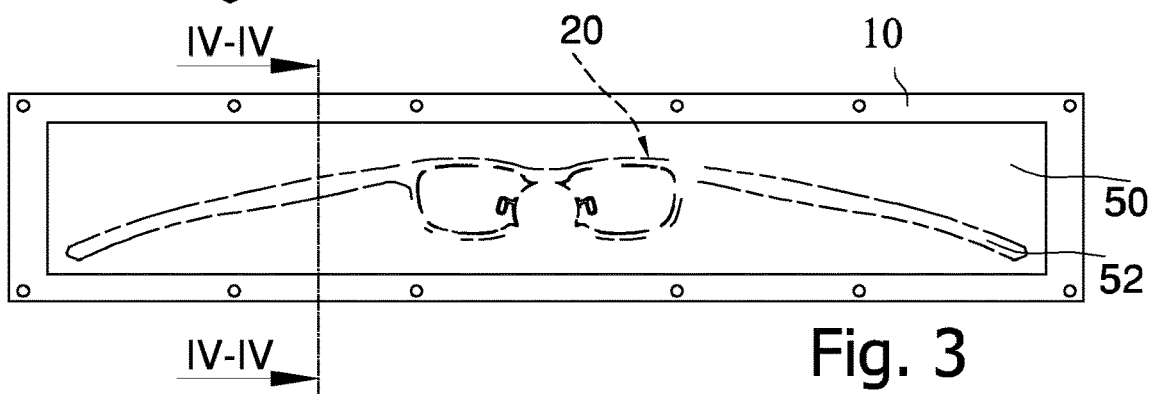
FIG. 3 shows a plan view of the lamina in FIG. 1 for a subsequent step of the method.

The lamina 10 is then inserted inside a cavity of a mold (not shown) and on the core 20 polymeric material 50, such as rubber or plastic, is over-injected. The multilayered piece resulting from this step is shown in FIGS. 3 and 4.

It is seen that the material 50 has covered the lamina 10, and especially has formed a layer 52 which has covered the two opposite major faces of the core 20 and has invaded the slot 16. The core 20 is shown dotted in FIG. 3.

Then, it is proceeded to cut the so-coated lamina 10 according to the underlying profile of the core 20, that is, along the innermost edge of the slot 16, thereby getting an isolated pair of glasses 60 as in FIG. 6. From the cross-section of FIG. 5, there is shown the internal structure e.g. of a temple 62 (resulting from the initial coating of the temple 22 also in the drawings of the core 20). The injected polymeric material 52 has adhered to the opposite surfaces of the temple 28 forming two layers and has also invaded the holes 32. The segment of polymeric material inside the holes 32 connects the two outer layers, therefore, when the material becomes solid it remains fixedly gripped to the core 20.

In particular, the removal of the eyeglasses from the lamina 10, which takes place by cutting the excess material 50, is facilitated by the particular structure of the attachment points. Just a small effort is needed to disconnect the tab 18 from the concavity 34, and if—as it often happens—the tearing area has small burrs there is no risk that they will cut a person, because they remain hidden inside the concavity 34, away from the edge B of the eyeglasses 60 and covered by the (cut) margins of the material 52.

FIG. 7 shows the eyeglasses as ready for use, after a step of bending of the temples 62 and of the pads 28. In FIG. 5 one can see an edge B along which the core 20 is visible from the outside, exposed in sight.

Figure 8:
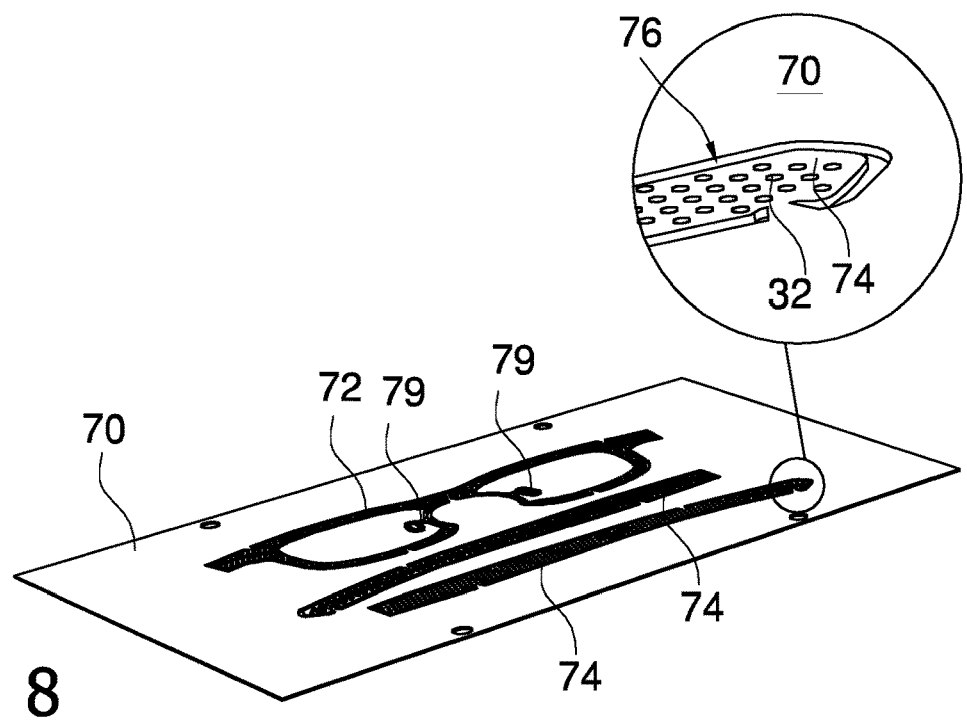
FIG. 8 shows an isometric view of a metal lamina for a variant of the method.

A variant of the method (FIGS. 8-10) envisages to produce on a metal lamina 70 separated parts of eyeglasses, e.g. a frame front 72 and isolated temples 74. The area of the lamina 70 corresponding to the frame front 72 and to the isolated temples 74 comprises as before holes 32 and is separated from the rest of the lamina 70 by a through-groove 76, with the exception of local attachment points made like those of the previous variant. It is also possible that a perforated area includes a solid portion (without holes), for example in the frame front 72 the portion relative to pads 79 is solid.

Figure 9:
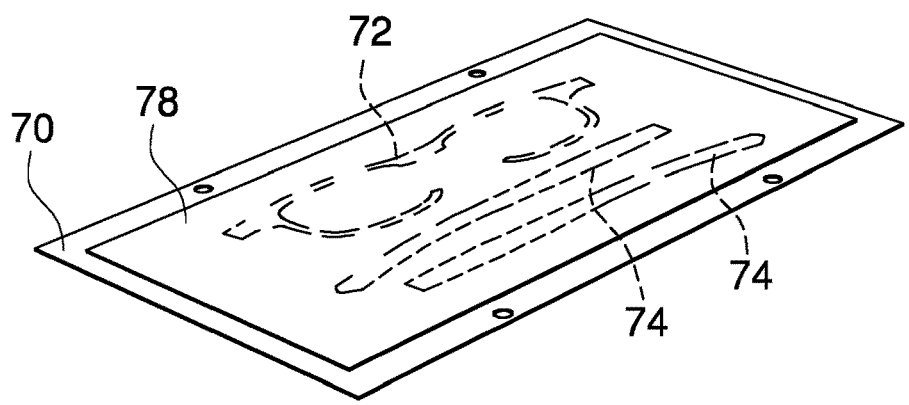
FIG. 9 shows an isometric view of the lamina in FIG. 8 for a subsequent phase of the method.

The lamina 70 is then inserted inside a cavity of a mold (not shown) and there polymeric material 78 is over-injected, FIG. 9, that covers it on the two opposite major faces and invades the groove 76. The core of the components of the eyeglasses is shown dashed in FIG. 9.

Figure 10:
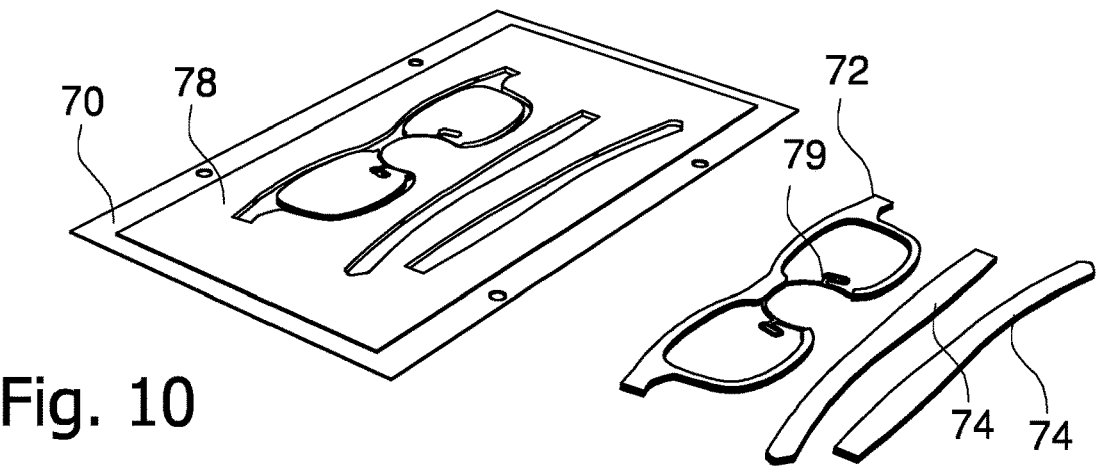
FIG. 10 shows a three-dimensional view of parts of eyeglasses obtained by the method.

It is then proceeded to cut the so-covered lamina 70 in accordance with the underlying profile of the components, that is, by separating them along the innermost edge of the groove 76, thus obtaining the components isolated as in FIG. 10. Their internal structure is as shown in FIG. 5 and is as that of the eyeglasses 60. Note that each part 72, 74 is made as the whole eyeglasses 60. The pads 79 on the isolated frame front are formed by smooth and exposed metallic parts, which allowed the easy removal of the overlying material 78.

Figure 11:
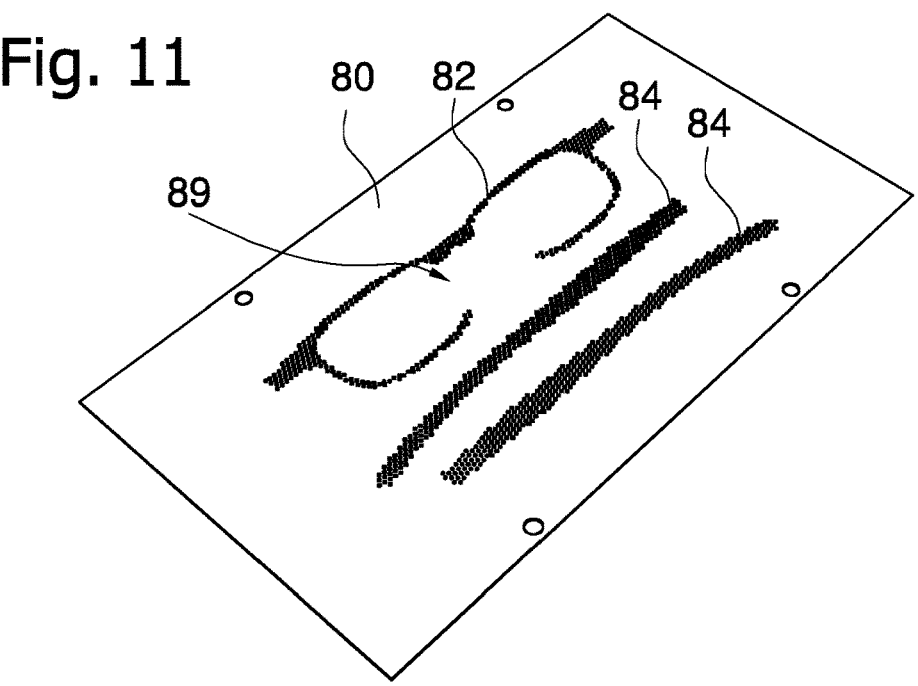
FIG. 11 shows an isometric view of a lamina for a second variant of the method.
Figure 12:
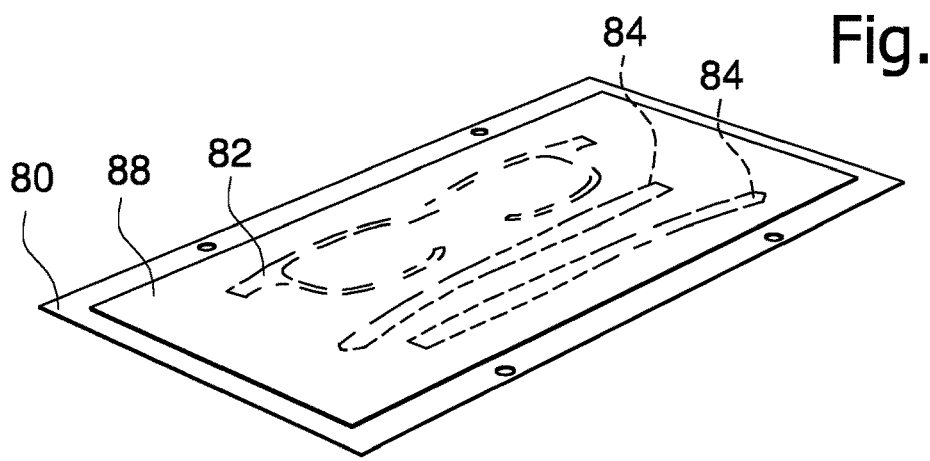
FIG. 12 shows an isometric view of the lamina in FIG. 11 for a subsequent step of the method.
Figure 13:
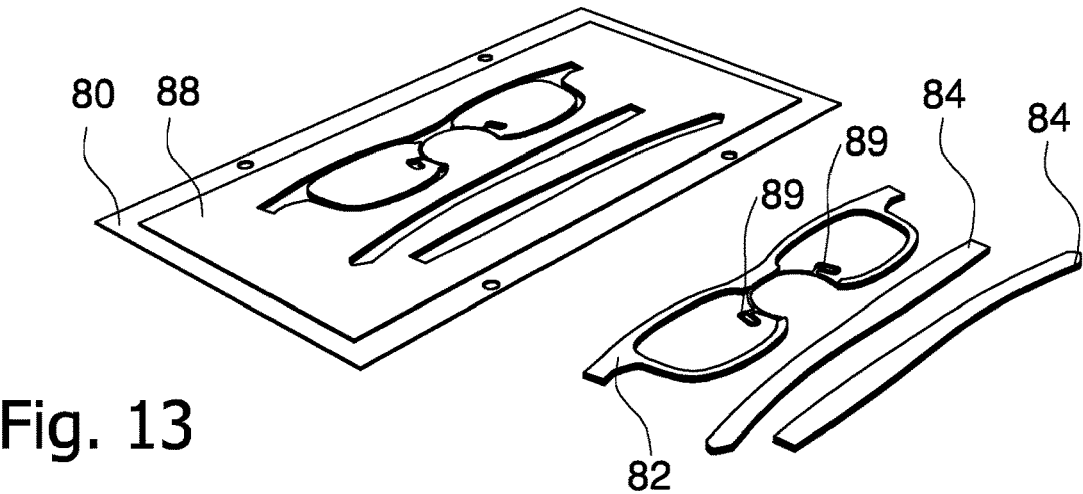
FIG. 13 shows a three dimensional view of parts of eyeglasses.

A second variant of the method (FIGS. 11-13) envisages to produce on a metallic lamina 80 separated parts of eyeglasses, e.g. a frame front 82 and isolated temples 84. In this case only the area of the lamina 80 corresponding to the frame front 82 and the isolated temples 84 comprises as before holes 32, while the remaining area is solid and continuous. There is no pass-through groove between the perforated areas and the adjacent solid ones. It is also possible that a perforated area relating to a component comprised a solid portion (without holes), e.g. in the frame front 82 the portion related to pads 89 is solid.

The lamina 80 (FIG. 12) is then inserted inside a cavity of a mold (not shown) and there is over-injected polymeric material 88 (FIG. 12), that covers it on the two major opposite faces. The core of the components of the eyeglasses is shown dotted in FIG. 12.

It is then proceeded (FIG. 13) to cut all the layers of the so-coated lamina 80 according to a defined profile, so as to isolate the components, that is, by separating them along a contour that surrounds all the holes 32 of each component. The result is the set of isolated components as in FIG. 13. Their internal structure is as shown in FIG. 5 and is as that of the eyeglasses 60. Note that the pads 89 are not covered by material 88, because the cutting profile also included portions of coated lamina 80 without holes 32 and from such portions the material 88 has been removed.

Figure 14:
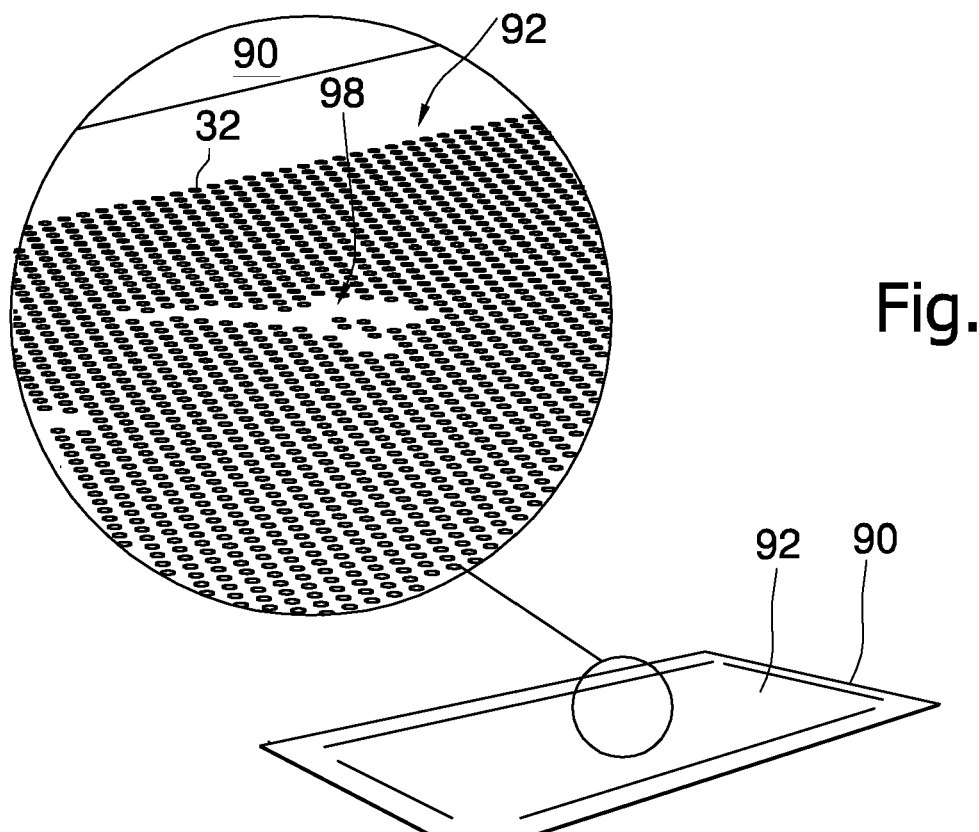
FIG. 14 shows an isometric view of a metal lamina for a third variant of the method.
Figure 15:
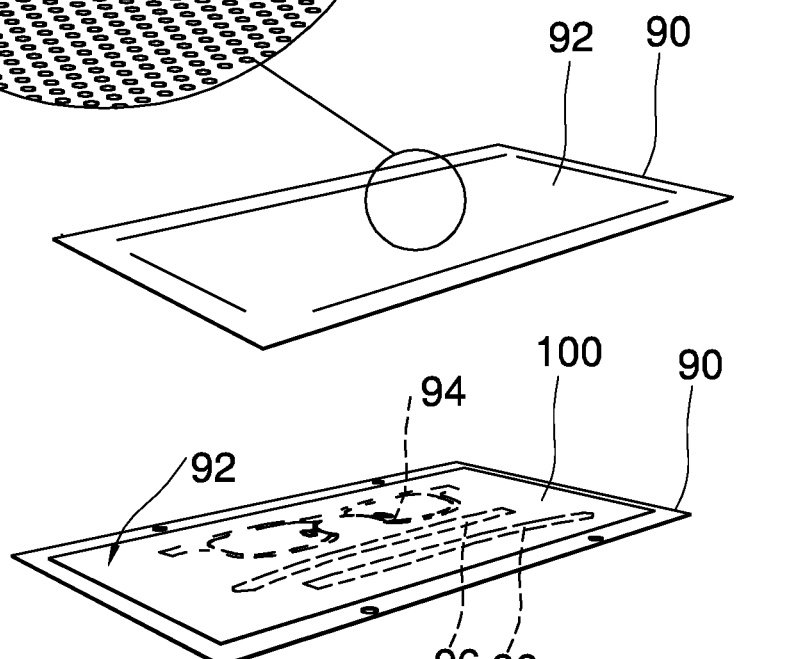
FIG. 15 shows an isometric view of the lamina in FIG. 14 for a subsequent step of the method.
Figure 16:
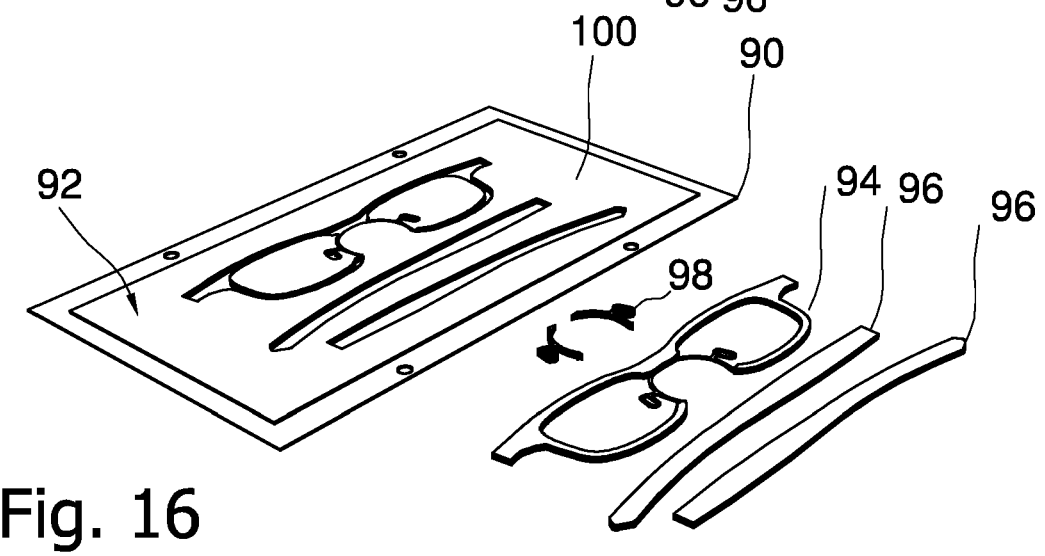
FIG. 16 shows a three dimensional view of parts of eyeglasses.

A third variant of the method (FIGS. 14-16) envisages to achieve on a surface 92 of a metallic lamina 90 separated parts of eyewear, e.g. a frame front 94 and isolated temples 96. In this case the whole area of the surface 92 comprises holes 32, while only a small central part 98 remains solid (corresponding then to the nose pads of the eyeglasses). FIG. 14 shows the holes 32 only in an enlarged detail, for better understanding.

The surface 92 (FIG. 15) is then inserted inside a cavity of a mold (not shown) and there is over-injected polymeric material 100, that covers it on the two opposite faces. The core of the components of the eyeglasses is shown with a dashed outline in FIG. 15.

It is then proceeded (FIG. 16) to cut all the layers of the lamina 90 covered by the material 100 according to the predefined profile so as to isolate the components, that is, by separating them along the profile of the lamina 100. From the separation of such contour from the sandwich of FIG. 15 one thus gets the set of isolated components as in FIG. 16. Their internal structure is as shown in FIG. 5 and is as that of the eyeglasses 60.

Note that the area of the lamina where there are no holes 32, to then derive e.g. nose pads therefrom, may be always the same among many models.

In general, in each variant the processing of the coated lamina may comprise a cutting step, to separate the components or the eyeglasses, and an optional step in which only the over-molded material is cut or removed. This optional step ensures that on the final object there is formed an edge of the lamina which protrudes a bit (few mm) from the margin of a layer of over-molded material. This can be done especially around the area of the frame front that holds a lens, in order to be able to mount lenses that have a peripheral groove.

The invention claimed is:

1. A method for producing an object comprising a structural core and an outer coating of polymeric material, comprising the steps of
(i) coating with polymeric material a metallic lamina, wherein the lamina comprises a margin and a surface exhibiting macroscopic discontinuities configured so that the polymeric material grips to them in order to form a multilayered piece;
(ii) removing parts from the multilayer piece to obtain a contour corresponding to the object, the contour comprising an edge along which the margin of the lamina remains uncovered by the polymeric material.

2. The method according to claim 1, wherein the surface of the lamina is processed to derive therein macroscopic discontinuities constituted by pass-through openings or concavities, and the lamina so processed is used to perform step (i).

3. The method according to claim 1, wherein in the lamina a pass-through groove is produced for deriving for said contour a perimetral profile detached from the rest of the lamina except for some local attachment points to be broken,
inlets are produced in the perimetral profile and at the inlets the local attachment points are arranged;
and in step (ii) the contour is separated by removing polymeric material deposited in the groove during step (i).

4. The method according to claim 1, wherein a lamina is produced comprising a surface exhibiting macroscopic discontinuities within two or more isolated areas corresponding to distinct objects to be produced, and in step (ii) contours circumscribed to such areas are detached from the multilayered piece to isolate the relevant objects.

5. The method according to claim 1, wherein in step (ii) said contour is separated only by cutting the multilayered piece in correspondence of overlapping layers of polymeric material and lamina.

6. The method according to claim 1, wherein polymeric material, which has been deposited over areas of the contour which are free of macroscopic discontinuities, is removed, preferably along a margin of the lamina.

7. The method according to claim 1, wherein, before or after step (ii), on the surface layer of polymeric material of the contour another material is applied.

8. The method according to claim 1, wherein, before or after step (ii), on the surface layer of polymeric material of the contour another material is applied chosen among: fabric, wool, leather, wood, horn, carbon fiber, acetate, gold or silver leaf, perforated steel, or stones, precious stones, studs.

9. The method according to claim 1, wherein in step (i) the lamina is obtained by separating it from a larger lamina, and said removal of parts in step (ii) is characterized by the further step of separating from the multilayered piece a contour corresponding to the object, so that the contour comprises an edge along which a margin of the lamina remains uncovered by the plastic material.

10. The method according to claim 1, wherein the polymeric material covering the lamina is chosen among: polyurethane or silicone rubber, cellulose acetate, methacrylate, polyethylene, grilamid, nylon or polypropylene, but also an epoxy resin; and/or a natural polymeric material chosen among rubber, natural rubber, wood, leather, or horn.

11. The method according to claim 1, wherein said object is selected from the group consisting of: a frame front of eyeglasses, a temple, or a terminal or a front mask of eyeglasses.

12. The method according to claim 1, wherein
step (i) takes place by melting the polymeric material after depositing the lamina into a mold cavity;
between step (i) and step (ii) the polymeric material is awaited for gripping to, and solidify on, the discontinuities; and
from the multilayered piece a contour is separated corresponding to the object so that the contour comprises an edge (B) along which a margin of the lamina remains uncovered by the polymeric material.

13. The method according to claim 12, wherein, before step (i) a second material is arranged on a bottom of the mold to make it couple with the polymeric material, wherein the bottom of the mold preferably comprises a pattern to be transferred to the second material.

14. The method according to claim 13, wherein said second material on a bottom of the mold is selected among: fabric, wool, leather, wood, horn, carbon fiber, acetate, gold or silver leaf, perforated steel, or stones, precious stones, or studs.

15. An object produced by the method comprising a multilayered structure composed of an inner structural metallic core, having an edge and, an outer coating made of polymeric material, the core comprising a surface exhibiting macroscopic discontinuities to which the polymeric material is gripped, and the object comprising a surface in which the edge of the core remains uncovered.

16. The object according to claim 15, wherein the uncovered edge of the core comprises the visible overlapping of the core and at least one layer of plastic material.

17. The object according to claim 15, wherein the uncovered edge of the core is sandwiched between two layers of plastic material.

18. The object according to claim 15, wherein said object is selected from the group consisting of: a frame front of eyeglasses, a temple, or a terminal or a front mask of eyeglasses.

19. The object according to claim 15, wherein said structure comprises a portion clear from plastic material, in said clear portion the core having a surface devoid of macroscopic discontinuities.

20. The object according to claim 19, wherein the surface devoid of macroscopic discontinuities is a peripheral edge of the lamina protruding from one layer of plastic material or an area of the lamina clear from plastic material.

* * * * *